United States Patent [19]

Deininger et al.

[11] 4,241,804
[45] Dec. 30, 1980

[54] SERVO STEERING SYSTEM FOR MOTOR VEHICLES

[75] Inventors: Horst Deininger; Werner Breitweg, both of Schwaebisch-Gmund, Fed. Rep. of Germany

[73] Assignee: Zahnradfabrik Friedrichshafen AG, Friedrichshafen, Fed. Rep. of Germany

[21] Appl. No.: 952,925

[22] Filed: Oct. 19, 1978

[30] Foreign Application Priority Data

Oct. 19, 1977 [DE] Fed. Rep. of Germany ....... 2746919

[51] Int. Cl.³ .............................................. B62D 5/04
[52] U.S. Cl. ................................. 180/79.1; 192/48.91; 192/51
[58] Field of Search .................... 180/79.1, 79.3, 79, 180/132, 146, 147; 192/48.91, 51

[56] References Cited

U.S. PATENT DOCUMENTS

| 1,868,082 | 7/1932 | Swartz | 180/79.3 |
| 2,775,132 | 12/1956 | Orr | 180/79.1 |

FOREIGN PATENT DOCUMENTS

| 1133642 | 7/1962 | Fed. Rep. of Germany | 180/147 |
| 1182816 | 3/1970 | United Kingdom | 180/79.1 |

*Primary Examiner*—John P. Silverstrim
*Attorney, Agent, or Firm*—Zalkind & Shuster

[57] ABSTRACT

A servomotor drives a steering gear through a pair of clutch drums to provide power assist in the proper rotational direction upon engagement of one of the clutch drums in response to manual torque applied to a steering shaft causing torsional displacement between its shaft sections interconnected by a torsion bar. The clutch drums are continuously driven in opposite directions by the servomotor through gearing and are respectively engaged by jaws mounted on a pair of clutch carriers respectively keyed to the shaft sections of the steering shaft.

11 Claims, 5 Drawing Figures

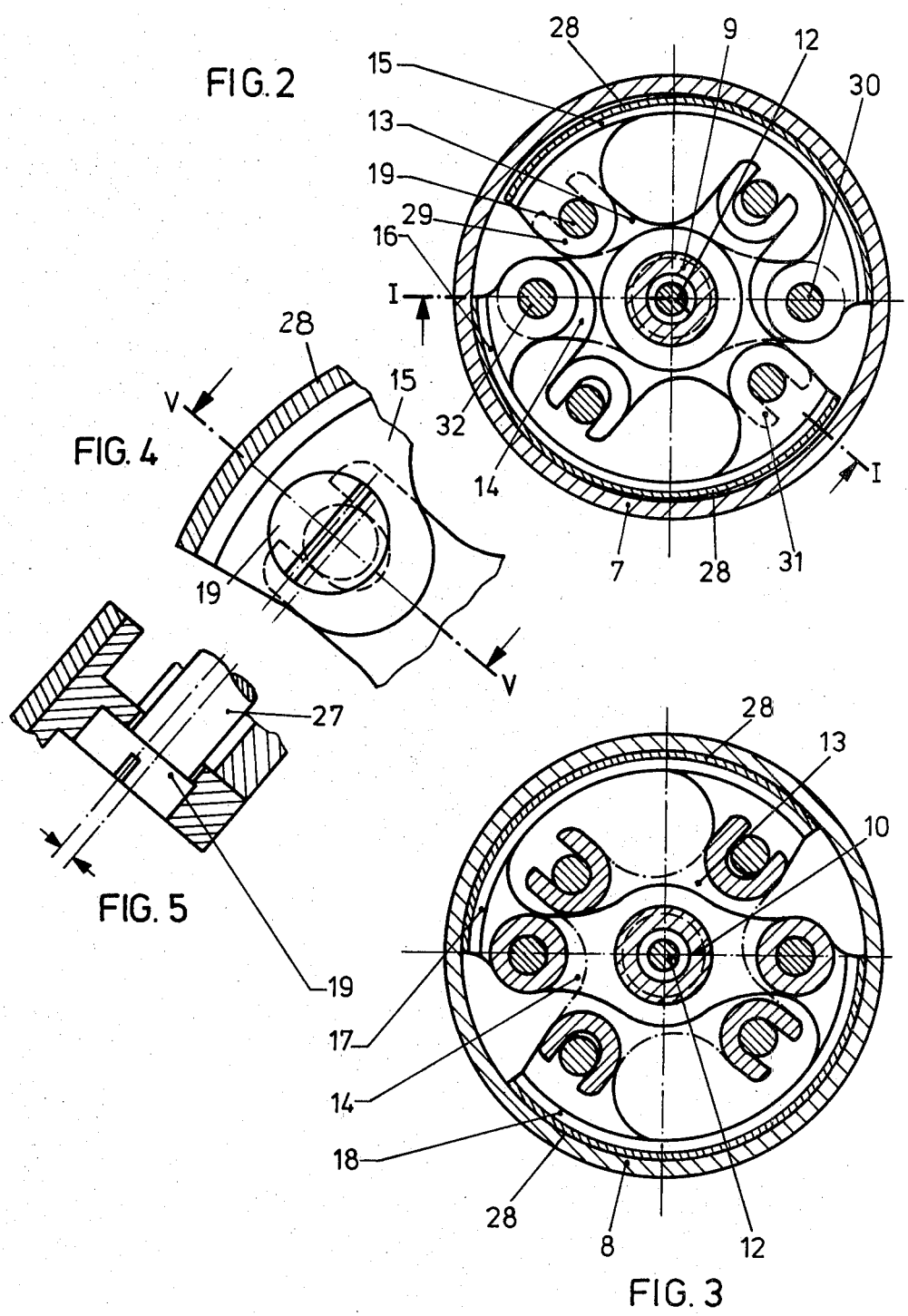

4,241,804

SERVO STEERING SYSTEM FOR MOTOR VEHICLES

BACKGROUND OF THE INVENTION

This invention relates to a servo steering apparatus for motor vehicles having a driving shaft operated by a hand steering wheel and a driven shaft to which an auxiliary torque is imparted through two friction clutches, each engaging in only one rotational direction and both driven by an auxiliary driving source.

Steering reinforcing systems with two oppositely rotating multiple disc clutches are known as disclosed for example in German Pat. No. OS 1630301. When the steering wheel is turned in either direction in such systems, an axial force is exerted upon one of the clutches assigned to each direction of turning, by means of worm gearing between the driving and driven sections of the steering shaft. Such axial force causes frictional contact between a rotating clutch carrier and the driven section of the steering shaft to deliver servo reinforcement power to the steering shaft depending on the manual force imparted to the steering wheel. Steering reinforcing systems of the foregoing type have the disadvantage that both the worm gearing as well as the other driving connections contribute to a high frictional resistance to steering. Thus, the danger exists that because of heavy thrusts generated by road bed loading, one of the clutches will remain engaged to impart servo steering power through the steering gear without any driver initiated steering movement.

Other servo steering apparatus for motor vehicles are known as disclosed for example in German Pat. Nos. OS 2238125 and DR OS 2533940, wherein an electric motor is switched on in response to rotation of the steering wheel, directionally sensed by a transmitter element, so that the motor transmits its torque to the steering shaft either through one clutch for both directions of rotation or through two clutches for each direction of rotation. The foregoing type of steering apparatus has the disadvantage that the armature of the electric motor and the gear and coupling parts associated therewith must be accelerated from standstill in response to every steering movement and in the event of a rapid change of direction, braking of the armature and then acceleration in the opposite direction must be effected. As a result, the steering response is impaired. In German Pat. No. OS 2603306, an auxiliary power steering system for motor vehicles has been described wherein an auxiliary torque is produced through two asymmetrically-built loop or expanding spring clutches. However, these clutches do not have a proportional response characteristic. Moreover, the auxiliary torque persists too long because of the loop springs, so that an over-travel condition occurs. The reduction drive necessary for reducing the speed of the auxiliary driving source, is also a disadvantage of the foregoing type of servo steering system. Because of automatic locking, the auxiliary driving source may not be switched off. Further, this type of system defeats any attempt to achieve a compact and short overall construction.

It is therefore an important object of the present invention to provide a servo steering apparatus which is constructed in a simple and compact manner and which exhibits good proportional response performance.

SUMMARY OF THE INVENTION

According to the present invention, friction clutches having jaws engageable with clutch drums, are attached in pairs to one end of one clutch carrier keyed to the driving section of a steering shaft and to a separate clutch carrier keyed to the driven section of the steering shaft, whereby one pair of jaws is engaged for each rotational direction while the other pair of jaws are disengaged.

The aforementioned disadvantages of the prior art systems, are avoided by the present invention through an arrangement of jaw clutches that do not wedge and remain engaged as a result of the introduction of manual torque or road bed thrusts. Further, no delays occur upon initiating steering motion because of mass acceleration, inasmuch as the clutch drums are rotated continuously in both directions and the servo force is applied immediately. Since the clutch jaws are engaged with the drums by manual force, a very good responsive performance is achieved. The driving source, such as an electric motor, need operate only in one direction of rotation in accordance with present invention so that other driving sources may be used, such as the vehicle engine.

A further advantage of the present invention resides in a simple and compact construction. Furthermore, provision has been made according to the present invention for the separate clutch carriers to be interconnected by a flexible coupling in the form of a torsion bar so that a restoring torque will result, dependent on the torsion angle between the two clutch carriers. Precise operation of the auxiliary power steering system is thereby attained. Moreover, servo power operation is initiated by the torsion bar only when a minimum steering force is exceeded.

Another advantageous feature of the invention resides in joint drive of the clutch drums by the auxiliary driving source through worm gearing and bevel gearing for rotation of the drums in opposite directions. As a result of such gearing, a sufficient drive reduction is achieved without a reversing gear. A one-way clutch is also disposed between the auxiliary driving source and the bevel gearing so that the bevel gearing may freely rotate in the rotational direction of drive should the auxiliary drive source stop or fail. This permits switching off of the auxiliary drive source in case of rapid travel as well as to limit use of the servo power assist as an aid to parking. When switched off, or in case of failure of the servo power drive source, the clutch mechanism may be rotated with little friction by the steering wheel and one may steer without servo assistance.

It is of further advantage that the clutch drums may be driven at a higher rotational speed than that produced by manual operation of the steering wheel so that the two clutches always operate under sliding friction conditions to avoid the higher adhesive friction under static conditions. Steering assistance may therefore operate more uniformly.

The present invention furthermore provides that both clutch drums be supported by one another through the centering action of plain anti-friction bearings. In this way, a more economical mounting arrangement is realized.

Another advantageous feature of the present invention resides in the separate clutch carriers having portions angularly spaced and interrelated in such a way that after exceeding a predetermined torsion angle between the clutch carriers, a direct inflexible drive of one clutch carrier by the other occurs. As a result, steering is still possible even though there is a breakdown in the steering aid caused for example by the wear of the clutch linings, bolts or breakage of the torsion bar.

The invention also features an adjustable connecting bolt having a bolt-head disposed eccentrically in relation to the bolt shank between the clutch carrier and the clutch jaw. By adjusting the eccentricity of the bolt head, spacing of the clutch jaws may be adjusted relative to the associated clutch drums.

A free-wheeling, one-way clutch is associated with the driving source in accordance with the present invention so that the driving source may be switched off by either a manual switch, a speedomotor, load isolators, torque measuring elements, a tachogenerator or combinations of the foregoing. The driving source may thus be switched on only as needed, as for example during free-wheeling or during first forward speed and reverse speed or in dependence on the speed of the motor, the speed of travel or after exceeding a certain operating force at the steering wheel. An arbitrary switching on or off of the auxiliary driving source is also contemplated.

BRIEF DESCRIPTION OF THE DRAWING FIGURES

FIG. 2 is a transverse section view taken substantially through a plane indicated by section line II—II in FIG. 1.

FIG. 3 is a transverse section view taken substantially through a plane indicated by section line III—III in FIG. 1.

FIG. 4 is an enlarged partial section view taken substantially through a plane indicated by section line IV—IV in FIG. 1.

FIG. 5 is a partial section view taken substantially through a plane indicated by section line V—V in FIG. 4.

DETAILED DESCRIPTION OF PREFERRED EMBODIMENT

Figure 1:
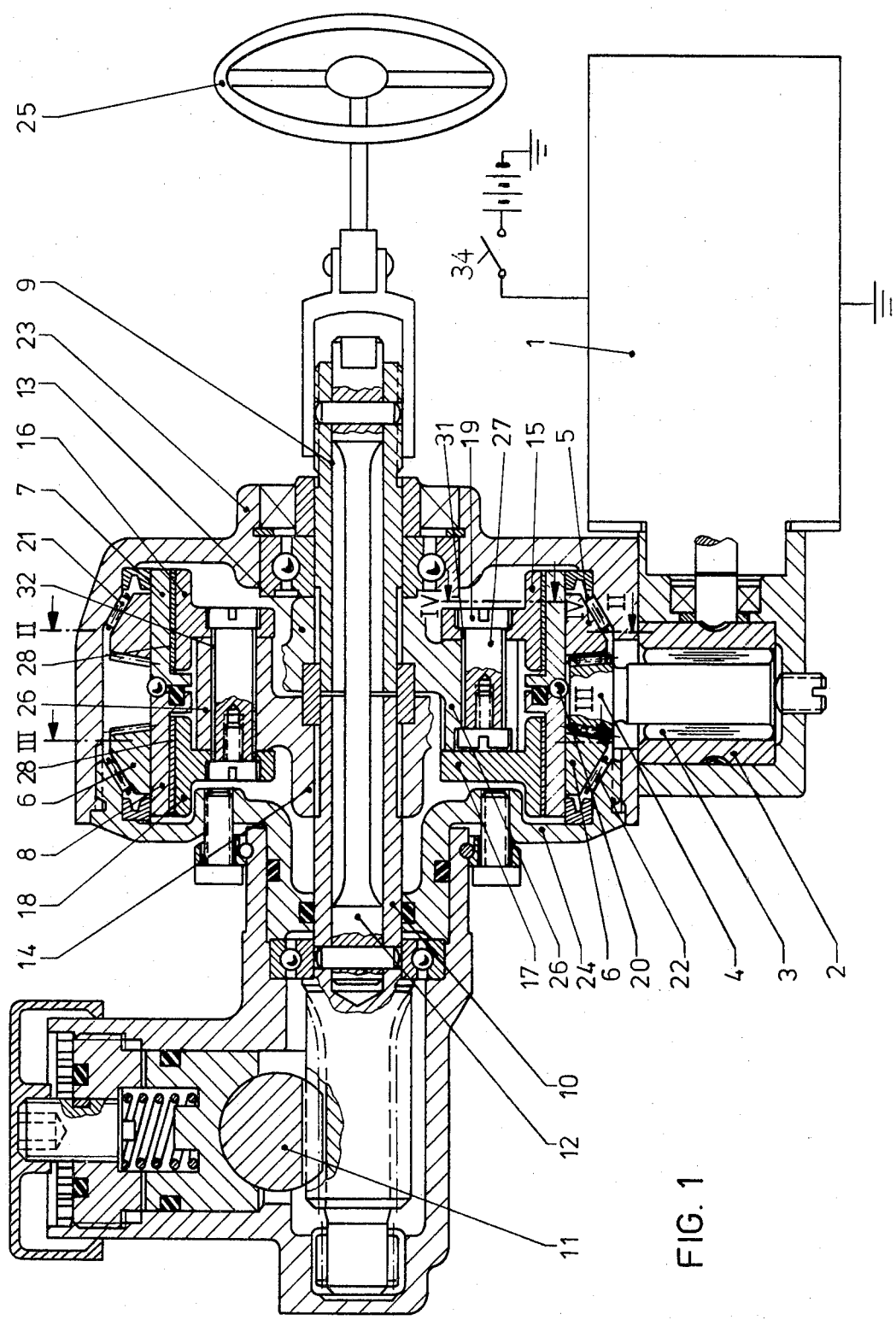
FIG. 1 is a longitudinal section view through a servo steering apparatus in accordance with the present invention.

Referring now to the drawings in detail, FIG. 1 shows an electric motor 1 drivingly connected to a worm gear 2 which is coupled by a free-wheeling, one-way clutch 3 to a bevel pinion 4. The pinion 4 meshes with two bevel gears 5 and 6 for rotation thereof in opposite directions. The bevel gears are respectively fixed to clutch drums 7 and 8. A steering shaft assembly is formed by an upper driving shaft section 9 to which a manual steering wheel 25 is connected, and a lower driven shaft section 10 to which a tooth rack 11 of the mechanical steering gear is drivingly connected for transmitting a manual torque and servo reinforcement to the steered wheels of a vehicle. Both shaft sections 9 and 10 are interconnected by a torsion spring bar 12 which permits angular displacement of the steering shaft sections 9 and 10 relative to each other depending on the torque applied. The shafts 9 and 10 of the steering shaft assembly are respectively keyed to separate clutch carriers 13 and 14 of a reversible clutch assembly. The clutch carriers are formed with axially overlapping, angularly spaced portions 26 aligned with a common rotational plane so that the relative torsional displacement angle of the shafts 9 and 10 of the steering shaft assembly are mutually limited and after exceeding a maximum permissable torsion angle, an inflexible drive between the two carriers is assured. The upper clutch carrier 13 is provided with a pair of clutch jaws 15 and 16 having linings 28 thereon. Each of the jaws 15 and 16 are engaged at opposite bearing points on the upper axial end of the carrier 13. A pair of clutch jaws 17 and 18 with linings 28 are engaged at the lower axial end of the carrier 13 so that the clutch jaws are driven without circumferencial play but are free to move radially.

A connecting bolt 19 connects each of the four jaws to the clutch carrier 13 or 14. The head of each bolt 19 is formed eccentrically relative to its shank 27 and is seated in the clutch jaw as more clearly seen in FIGS. 4 and 5. The radial position of each clutch jaw relative to the clutch drums is adjusted by the camming action produced upon rotation of the bolt head. All four clutch jaws are pivotally connected to the lower clutch carrier 14 at two opposite pivotal axes. As more clearly seen in FIGS. 2 and 3, each clutch jaw is connected to the clutch carriers 13 and 14 at two bearing points in such a way that one bearing point is fixed to one of the clutch carriers 14 and the other bearing point on the other clutch carrier 13 is displaceable radially in order to actuate the clutch assembly. For example, the clutch jaw 15 in FIG. 2 engages the upper axial end of the carrier 13 at a left-hand slide-bearing portion 29 and is pivotally connected to the upper axial end of carrier 14 at a right-hand pivot-bearing portion 30. The clutch jaw 16 is engaged by a slide-bearing portion 31 on the upper side of the clutch carrier 13 and is pivotally connected by the left-hand bearing portion 32 on the upper axial end of the clutch carrier 14.

The foregoing arrangement of the clutch jaws is such that rotary input from the steering wheel 25 causes one pair of jaws to be pressed against a clutch drum 7 or 8 driven in the direction of movement coinciding with the rotational direction of the rotary input. Whenever the upper shaft 9 of the steering shaft assembly is rotated in a clockwise direction by the steering wheel 25 for example, as viewed in FIG. 2, the clutch carrier 13 also rotates clockwise after the resistance of the torsion bar 12 is overcome. The jaws 15 and 16 on the upper end of the clutch carrier 13 will then engage the drum 7 rotating in the same clockwise direction while at the same time the jaws 17 and 18 are disengaged from drum 8 rotating in the opposite direction. The foregoing action is reversed directionally to cause engagement of jaws 17 and 18 whenever rotation is imparted counter-clockwise to the shaft 9. Thus, the rotational input is always power-assisted. The degree of assistance is proportional to the resistance transmitted from the steered wheels to the lower shaft section 10 of the steering shaft assembly. The degree of reinforcement depends on the jaw leverage, the diameter and width of the jaw linings 28 as well as the friction factor of the lining material.

The torsion bar 12 causes the servo reinforcement to act only on the steering wheel starting at a definite minimum force with both clutches to be completely disengaged below this minimum force. The clutch drums 7 and 8 are mutually supported by way of a grooved ball-bearing 20 and are rotatably mounted by inclined needle-bearings 21 and 22 in sections 23 and 24 of a housing assembly. The bearing points and gearing are enclosed in a space sealed by the housing assembly against the environment and are isolated from the friction linings 28 of the clutches. As a result of such sealing arrangement, a lubricant may fill the enclosed space without wetting the friction linings 28 of the clutches to maintain a sufficiently high friction value.

In summary, the servo motor 1 continuously imparts rotation to the two clutch drums 7 and 8 in opposite directions through worm gearing 2, one-way clutch 3, and bevel gearing 5 and 6 for power steering assist purposes. Each of the two clutch drums is engageable by a pair of clutch jaws. All four clutch jaws are pivotally connected at 30 and 32 to the carrier 14 keyed to the driven section of the steering shaft assembly connected by a torsion bar 12 to the driving shaft section 9 which is connected to the manual steering wheel 25. The clutch carrier 13 keyed to the driving section of the steering shaft, slidably engages each of the clutch jaws at 29 and 31 for pivotal displacement of jaws 15 and 16 relative to clutch drum 7 and jaws 17 and 18 relative to clutch drum 8. The pair of jaws 15 and 16 are thereby engaged with drum 7 when the driving shaft section is angularly displaced in one direction relative to the driven shaft section 10 so that torque is imparted by motor 1 to the driven shaft section in the same direction as driving shaft section 9 through drum 7 and carrier 14. The other pair of jaws 17 and 18 are engaged with drum 8 when the driving shaft section 9 is displaced in the other direction so that torque is imparted by the motor to the shaft section 10 in the other direction through drum 8 and carrier 14. When the servo motor 1 is stationary, the one-way clutch 3 overruns to permit manual steering with little friction. Accordingly, the servo motor 1 may be switched off at any time through switch 34 as shown in FIG. 1, under control of any suitable device as hereinbefore mentioned. Torque transmission through the clutches is limited by a torsion bar 12 preventing relative torsional displacement of the steering shaft sections below a minimum torque applied to thereby maintain the clutches disengaged. Manual steering by direct mechanical connection without power assist is therefore available under low loading conditions. Relative angular displacement of the steering shaft sections causing clutch engagement, is also limited to a maximum torsion angle at which the clutch carriers engage each other for continued joint rotation until the torque differential between applied and resisting torques is reduced below the maximum value permitted.

What is claimed is:

1. A servo steering system comprising a driving shaft (9), a hand steering wheel (25) connected to the driving shaft, a driven shaft (10), two friction clutches (15, 16-7 and 17, 18-14) releasably coupling the driving and driven shafts, an auxiliary driving source (1) and a gear unit (2, 5, 6) though which the friction clutches are driven by the source, said friction clutches including a pair of clutch drums (7, 8) driven in opposite directions through the gear unit, two pair of jaws (15, 16-17, 18) respectively engageable with said drums, a pair of clutch carriers (13, 14) connected to said driving and driven shafts, respectively, for rotation therewith, and means operatively connecting each of said jaws to both of said carriers for respectively causing engagement of one of the two friction clutches and disengagement of the other of the two friction clutches in response to rotation of said driving shaft in one direction and engagement of said other friction clutch and disengagement of said one friction clutch in response to rotation of said driving shaft in an opposite direction.

2. The servo steering system as defined in claim 1, including torsion spring means (12) interconnecting the two clutch carriers for resisting said relative angular displacement as a function of the angle between the two clutch carriers.

3. The servo steering system as defined in claim 1 or 2 wherein said gear unit includes worm gear means (2) connected to the auxiliary driving source for jointly driving the clutch drums and bevel gear means (4, 5, 6) drivingly connecting the worm gear means to the clutch drums for rotation thereof in opposite directions.

4. The servo steering system as defined in claim 3 including one-way clutch means (3) between the driving source and the bevel gear means for overrun of the bevel gear means when the auxiliary driving source is stationary.

5. The servo steering system as defined in claim 4 wherein the clutch drums are driven by the bevel gear means at a higher rotational speed than the steering wheel.

6. The servo steering system as defined in claim 5 including bearing means (20) supporting both of the clutch drums with a centering action.

7. The servo steering system as defined in claim 6 wherein the clutch carriers include angularly spaced portions (26) aligned with a common rotational plane to engage each other when a predetermined torsion angle between the clutch carriers is exceeded and thereby establish a direct drive therebetween.

8. The servo steering system as defined in claim 7 wherein said means operatively connecting each of said jaws to both of the carriers includes at least one adjustable connecting bolt (19) having a bolt shank (27) and a head disposed eccentrically in relation to the shank, said bolt shank being disposed between each of the clutch carriers and each of the clutch jaws.

9. The servo steering system as defined in claim 4 including switch means (34) connected to the driving source for de-energization thereof.

10. A servo steering system comprising a manual driving element (9), a driven steering element (10), a pair of separate clutch carriers (13 and 14) respectively fixed to the driving and driven elements, a pair of clutch members (7 and 8), power means (1, 2, 56) drivingly connected to said clutch members for rotation thereof in opposite directions, friction engaging means for transmitting torque to both of the clutch carriers from one or the other of the clutch members engaged therewith, flexible coupling means (12) interconnecting said driving and driven elements for elastically resisting relative angular displacement therebetween in response to torque applied thereto, and actuating means (29, 31) interconnecting said carriers with the friction engaging means for effecting engagement thereof in response to said relative angular displacement between the driving and driven elements to transmit torque from one of the clutch members in response to said relative angular displacement in one direction and transmit torque from the other of the clutch members in response to said relative angular displacement in the other direction.

11. The servo steering system as defined in claim 10 including inflexible drive means (26) directly transmitting torque between the clutch carriers when the relative angular displacement exceeds a limiting torsion angle.

* * * * *